US012105549B2

(12) United States Patent
Rao

(10) Patent No.: US 12,105,549 B2
(45) Date of Patent: Oct. 1, 2024

(54) VOLTAGE REFERENCE WITH CHOPPER CIRCUIT

(71) Applicant: RENESAS ELECTRONICS AMERICA INC., Milpitas, CA (US)

(72) Inventor: Sunil Satish Rao, Dresden (DE)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 207 days.

(21) Appl. No.: 17/708,636

(22) Filed: Mar. 30, 2022

(65) Prior Publication Data

US 2023/0315138 A1 Oct. 5, 2023

(51) Int. Cl.
*G05F 3/26* (2006.01)

(52) U.S. Cl.
CPC .................................... *G05F 3/262* (2013.01)

(58) Field of Classification Search
CPC ........................................................ G05F 3/262
See application file for complete search history.

(56) References Cited

U.S. PATENT DOCUMENTS

| | | | | |
|---|---|---|---|---|
| 8,482,342 B2 * | 7/2013 | Conte | G05F 3/30 327/539 |
| 8,704,588 B2 * | 4/2014 | Conte | G05F 3/30 327/539 |
| 9,912,309 B1 * | 3/2018 | Ecker | H03F 3/45977 |
| 10,983,547 B1 * | 4/2021 | Ivanov | G05F 3/267 |
| 2009/0284242 A1 * | 11/2009 | Motz | G05F 3/30 330/253 |
| 2014/0132241 A1 * | 5/2014 | Fukazawa | G05F 3/16 323/314 |
| 2018/0095491 A1 * | 4/2018 | Lacy | H03F 1/26 |
| 2020/0099351 A1 * | 3/2020 | Kasha | H03F 1/26 |
| 2021/0305955 A1 * | 9/2021 | Ozalevli | H03F 3/387 |
| 2023/0288951 A1 * | 9/2023 | Kanoun | G05F 3/30 |

FOREIGN PATENT DOCUMENTS

| | | | |
|---|---|---|---|
| CN | 101458540 A * | 6/2009 | |
| CN | 105807827 A * | 7/2016 | |
| CN | 112947659 A * | 6/2021 | G05F 1/561 |
| CN | 113508353 A * | 10/2021 | G05F 3/205 |
| CN | 114945887 A * | 8/2022 | G05F 3/267 |

* cited by examiner

*Primary Examiner* — Sisay G Tiku
(74) *Attorney, Agent, or Firm* — SCULLY, SCOTT, MURPHY & PRESSER, P.C.

(57) ABSTRACT

In an embodiment, a voltage reference circuit is disclosed that includes a first transistor circuit that is configured to receive an external supply voltage as an input and to output a first voltage and a chopper circuit that is configured to receive a second voltage as an input and to output a voltage reference. The chopper circuit has a breakage threshold. The voltage reference circuit further includes a second transistor circuit that is configured to receive the first voltage as an input and to output the second voltage at a value that is less than or equal to the breakage threshold of the chopper circuit.

18 Claims, 6 Drawing Sheets

VOLTAGE REFERENCE WITH CHOPPER CIRCUIT

BACKGROUND OF THE SPECIFICATION

The present disclosure relates in general to apparatuses and methods for generating a voltage reference.

A voltage reference is an electronic device that is configured to produce a fixed and steady voltage irrespective of the loading on the device, power supply variations, temperature changes, manufacturing non-idealities and the passage of time. Voltage references are used in power supplies, analog-to-digital converters, digital-to-analog converters and other measurement and control systems and are the heart of analog circuits. Voltage references may vary widely in their performance. For example, some voltage references may only hold their value to within a few percent of the nominal value while other voltage references may have precisions and stability measured in parts per million. Typically, voltage references will have as low noise as possible because noise from the voltage reference may limit the resolution of the other components where its value is being used. Having a low noise and high resolution voltage reference may be desirable for many sensor front-end applications.

SUMMARY

In an embodiment, a voltage reference circuit is disclosed that comprises a first transistor circuit that is configured to receive an external supply voltage as an input and to output a first voltage and a chopper circuit that is configured to receive a second voltage as an input and to output a voltage reference. The chopper circuit has a breakage threshold. The voltage reference circuit further comprises a second transistor circuit that is configured to receive the first voltage as an input and to output the second voltage at a value that is less than or equal to the breakage threshold of the chopper circuit.

In another embodiment, a semiconductor device is disclosed that comprises a chopper circuit that is configured to receive a first voltage as an input and to output a fixed voltage reference. The chopper circuit has a breakage threshold based at least in part on a control voltage. The semiconductor device further comprises a transistor circuit comprising a plurality of transistors that are configured in a cascode arrangement. The transistor circuit is configured to receive a second voltage as an input and to output the first voltage at a value that is less than or equal to the breakage threshold of the chopper circuit.

In another embodiment, A voltage reference circuit is disclosed that comprises a first transistor that is configured to receive an external supply voltage as an input and to output a first voltage, a second transistor that is configured to receive the external supply voltage as an input and to output a second voltage, a third transistor that is configured to receive the first voltage as an input and to output a third voltage, a fourth transistor that is configured to receive the second voltage as an input and to output a fourth voltage and a chopper circuit that is configured to receive the third and fourth voltages as inputs and to output a fixed voltage reference. The chopper circuit has a breakage threshold based at least in part on a control voltage of the chopper circuit. The first and second transistors are configured in a current mirror arrangement and the third and fourth transistors are configured in a cascode arrangement. The cascode arrangement is configured to output the third and fourth voltages at values that are less than or equal to the breakage threshold of the chopper circuit.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
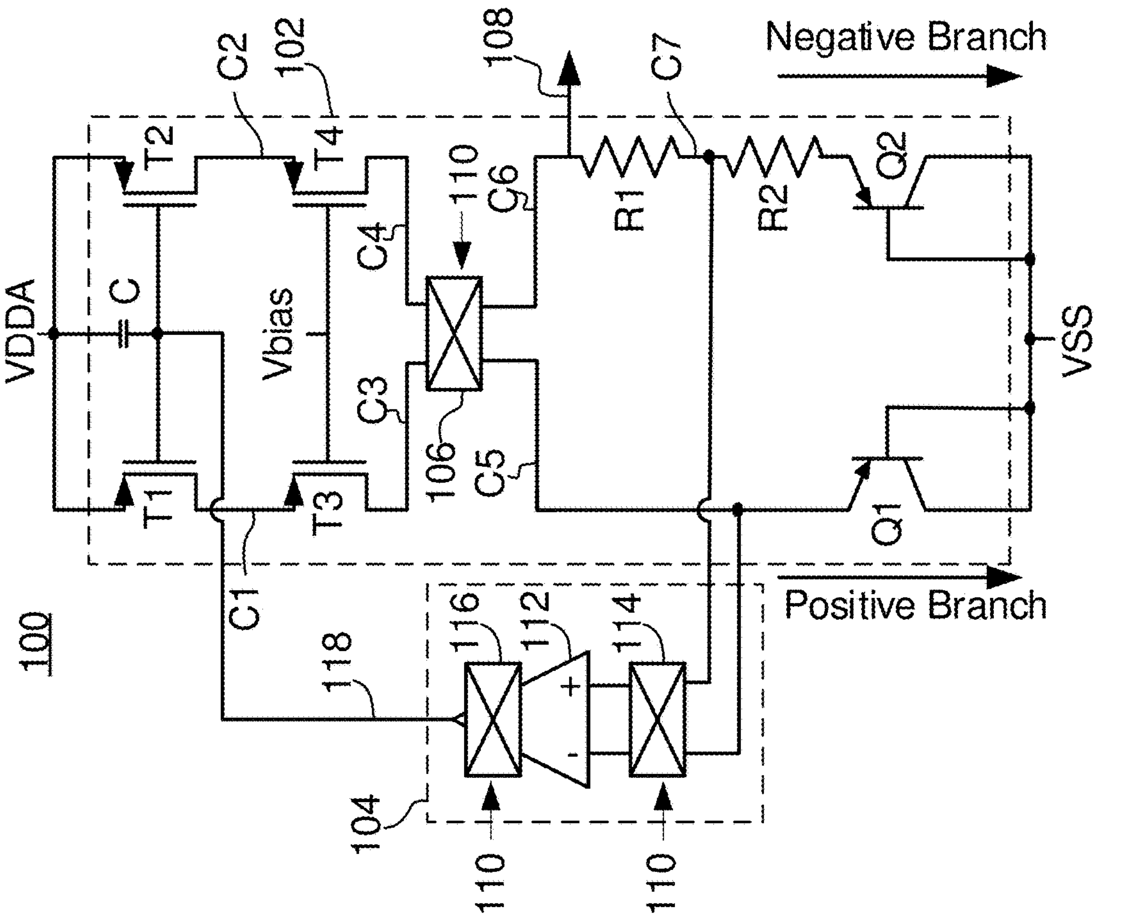
FIG. 1 is a circuit diagram of an example voltage reference circuit according to an embodiment.

Bandgap voltage references are often stable to variation in supply voltage and temperature. However, non-idealities due to manufacturing such as a charismatic mismatch between two identical devices may be difficult to overcome in a manner that also provides a low noise voltage reference signal. A bandgap voltage reference utilizing a chopper technique is disclosed that is configured to overcome such non-idealities due to manufacturing while also providing a low noise voltage reference signal, stability to variations in supply voltage and stability in variations due to temperature. In some embodiments, a double chopping technique may be utilized to reduce the low frequency noise and non-idealities due to mismatches in both the error amplifier circuit and bandgap circuit of the bandgap voltage reference. As an example, a chopper circuit may be implemented in the error amplifier circuit, which reduces the low frequency noise and mismatch non-idealities of the error amplifier circuit. In addition, a chopper circuit may be implemented at the bandgap circuit, which reduces the low frequency noise and mismatch non-idealities caused by transistors of the bandgap circuit.

In some cases, a residual offset voltage due to clock feed-through may occur in the chopper circuit at the bandgap circuit. For example, in the case where the chopper circuit comprises a MOS switch, the clock transitions are coupled to the sampling capacitor through the gate-drain or gate-source overlap capacitance as shown in equation (1) below which may introduce an error in the sampled output voltage.

$$\Delta V = V_{CK} \frac{WC_{ov}}{WC_{ov} + C_H} \tag{1}$$

Where ΔV is the residual voltage, $V_{CK}$ is the amplitude of the clock, W is the transistor width, $C_{ov}$ is the overlap capacitance per unit width and CH is the capacitance of the sampling capacitor. According to equation (1), by reducing the amplitude of the clock $V_{CK}$, residual voltage may also be reduced. In order to reduce the amplitude of the clock $V_{CK}$, in an illustrative embodiment, the chopper circuit may use a low noise, low amplitude clock signal that is generated by clock generator of a low voltage component of a semiconductor device instead of the high noise input clock signal provided with the supply voltage.

Another cause of residual offset voltage in the chopper circuit may be demodulated clock feed-through current spikes. Such current spikes may be caused by an imbalance of the parasitic capacitors in the chopper circuit. For example, at the transition moments of the chopper clocks, due to clock feed-through, the mismatch between capacitances may cause AC current spikes at the positive and negative terminals of the output, thereby causing an AC current spike at the output based on the difference between the AC spikes of the terminals. The AC current spike may be rectified by the chopper circuit, which appears as a DC current spike at the input of the chopper circuit with an average value given by equation (2):

$$I_{offset,DC}=2(\Delta C_1-\Delta C_2)*V_{CK}f_{CH} \quad (2)$$

Where $\Delta C_1$ is the difference between the capacitors feeding the positive terminal, $\Delta C_2$ is the difference between the capacitors feeding the negative terminal, $V_{CK}$ is the amplitude of the clock and $f_{CH}$ is the clock frequency. The DC current spike contributes to the input offset current of the amplifier. This current goes through the series impedance of the chopper circuit and the input signal source, leading to a rectified input voltage spike.

The average DC value of the spike results in a residual offset as given by equation (3):

$$V_{OS}=2(R_1+R_2)*(\Delta C_1-\Delta C_2)*V_{CK}f_{CH} \quad (3)$$

Where $V_{OS}$ is the residual offset and $R_1+R_2$ is the input impedance including on-resistance of the chopper transistor switches and the impedance of the signal source. The DC current spike contributes to the input offset current of the amplifier which goes through the series impedance of the chopper circuit and the input signal source, leading to a rectified input voltage spike. By reducing the amplitude of the clock $V_{CK}$ residual offset voltage may also be reduced.

However, a chopper circuit in a voltage reference circuit that is configured to utilize a reduced amplitude clock signal may have significant design challenges. For example, the maximum voltage difference between the input and the output of the chopper circuit before breakage occurs may be relatively small compared to the input voltage of the voltage reference circuit, which may result in damage to the transistors of the chopper circuit.

With reference now to FIG. 1, a voltage reference circuit 100 is disclosed according to an illustrative embodiment. Voltage reference circuit 100 comprises a supply voltage VDDA, also sometimes referred to as VDD or an external supply, a bandgap circuit 102, an error amplifier circuit 104 and a ground voltage VSS. VDDA may comprise supply voltage value. In some embodiments, VDDA may have a range of 1.7V to 5.5V. In other embodiments, VDDA may have any other voltage value or range. In an illustrative embodiment VSS is connected to ground. In other embodiments, VSS may have any other voltage value or range.

Bandgap circuit 102 comprises a capacitor C, transistors T1, T2, T3 and T4, a chopper circuit 106, a bandgap output

108, resistors R1 and R2, transistors Q1 and Q2 and connections C1, C2, C3, C4, C5, C6 and C7. Bandgap circuit 102 comprises a positive branch and a negative branch. For example, the positive branch comprises the electrical path between VDDA and VSS via transistor T1, connection C1, transistor T3, connection C3, chopper circuit 106, connection C5 and transistor Q1. The negative branch comprises the electrical path between VDDA and VSS via transistor T2, connection C2, transistor T4, connection C4, chopper circuit 106, connection C6, resistor R1, connection C7, resistor R2 and transistor Q2. As shown in FIG. 1, connections C5 and C7 also output to error amplifier circuit 104 and connection C6 also outputs to bandgap output 108 for providing a voltage reference. In some embodiments, an alternative bandgap output connection or other circuitry may be utilized to output a current reference. In some embodiments, for example, bandgap output 108 may output a steady voltage reference of 1.23V. In other embodiments, bandgap output 108 may output any other voltage reference value.

Transistors T1, T2, T3 and T4 comprise field effect transistors (FETs) such as, e.g., metal-oxide-silicon FETs (MOSFETs), also referred to herein as MOS transistors. In some embodiments, one or more of transistors T1, T2, T3 and T4 comprise p-type MOS (PMOS) transistors, n-type MOS (NMOS) transistors or any other transistors. In an illustrative embodiment, transistors T1 and T2 comprise PMOS transistors. While transistors T1, T2, T3 and T4 are described with reference to FETs and MOSFETs in illustrative embodiments, other types of transistors may alternatively be used in other embodiments.

Transistors T1 and T2 are together configured in a current mirror arrangement for bandgap circuit 102 and transistors T3 and T4 are configured in a cascode arrangement for bandgap circuit 102. The control voltage for transistors T1 and T2 is received from the output of error amplifier circuit 104 and the control voltage for transistors T3 and T4 is a bias value Vbias. In some embodiments, Vbias is received from a diode connected a transistor circuit similar to that of transistors T3 and T4.

Transistors Q1 and Q2 comprise semiconductor devices such as, e.g., PNP transistors. In other embodiments, NPN transistors or any other type of semiconductor transistor may be used.

Figure 2:
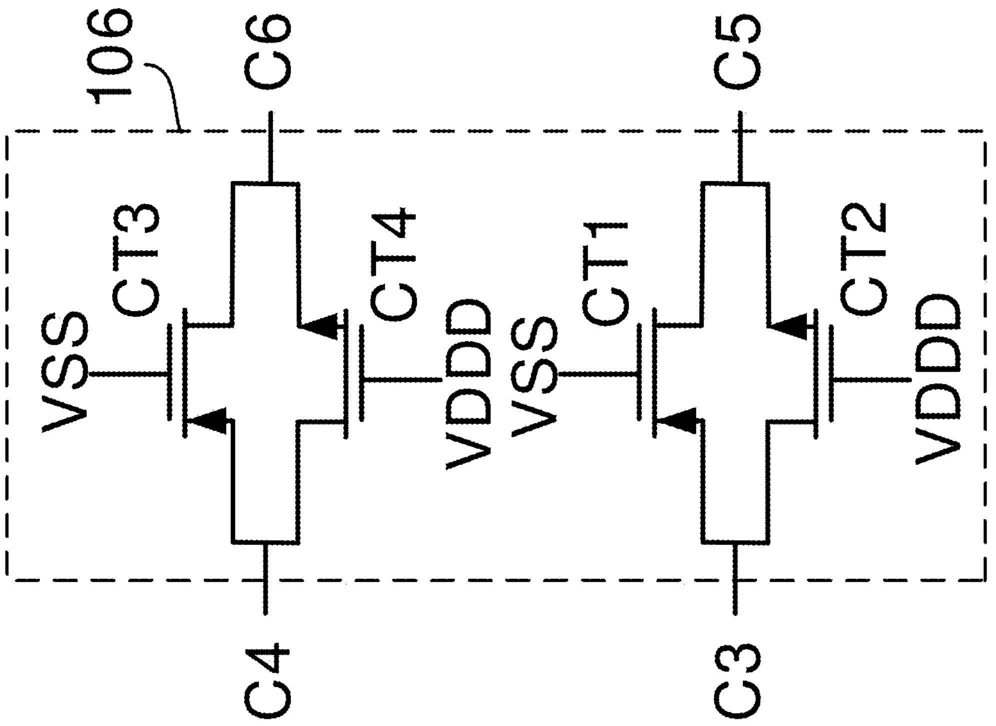
FIG. 2 is a circuit diagram illustrating an example chopper circuit of the voltage reference circuit of FIG. 1 according to an embodiment.

With reference to FIG. 2, an example chopper circuit 106 according to some embodiments will be described. Chopper circuit 106 comprises a circuit for each branch of bandgap circuit 102 and is controlled by an input 110 received from a semiconductor device 200 such as that shown in FIG. 3. Input 110 comprises a supply voltage VDDD and a clock signal. In some embodiments, chopper circuit 106 comprises one or more complementary switches, for example, as shown in FIG. 2. In other embodiments chopper circuit 106 may comprise any other types of switches or other circuitry including, e.g., clock feed-through switches.

On the positive branch, chopper circuit 106 inputs a signal from connector C3 that is fed through transistors CT1 and CT2 and output to connector C5. On the negative branch, chopper circuit 106 inputs a signal from connector C4 that is fed through transistors CT3 and CT4 and output to connector C6. In some embodiments, transistors CT1, CT2, CT3 and CT4 comprise FETS such as, e.g., MOSFETS. In an illustrative embodiment, one of transistors CT1 and CT2 comprises a PMOS transistor while the other of transistors CT1 and CT2 comprises an NMOS transistor. Similarly, one of transistors CT3 and CT4 comprises a PMOS transistor while the other of transistors CT3 and CT4 comprises an NMOS transistor. For example, transistors CT1 and CT3 may comprise NMOS transistors with VSS as the control voltage while transistors CT2 and CT4 may comprise PMOS transistors with a supply voltage VDDD as the control voltage.

Figure 3:
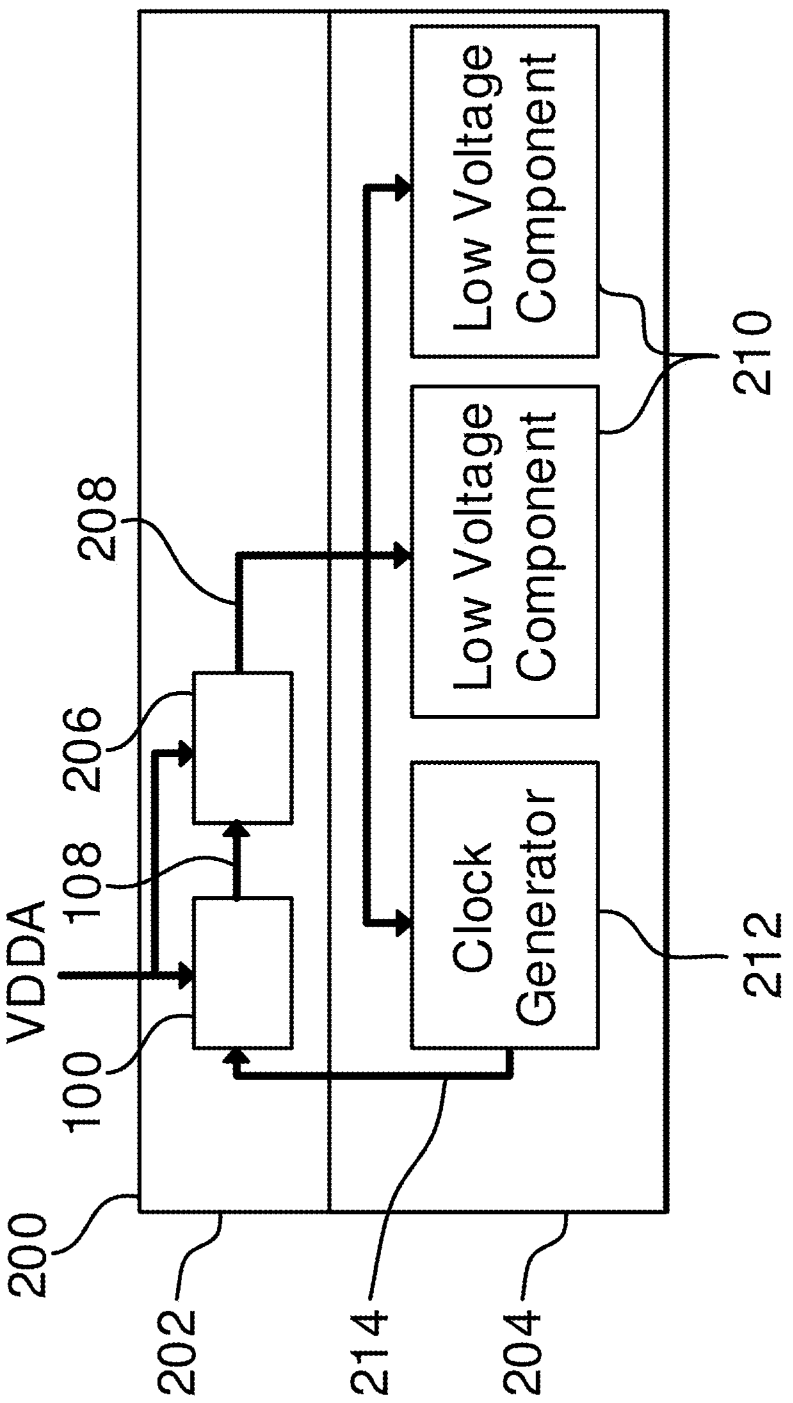
FIG. 3 is a circuit diagram illustrating an example semiconductor device according to an embodiment.

With reference to FIG. 3, semiconductor device 200 may comprise, for example, a printed circuit board (PCB), integrated circuit, or any other semiconductor device. Semiconductor device 200 comprises a high voltage component 202 and a low voltage component 204. High voltage component 202 receives VDDA as an input to both voltage reference circuit 100 and a voltage regulation module (VRM) 206 that is configured to provide a regulated output voltage 208 to low voltage component 204. VRM 206 also receives bandgap output 108 from voltage reference circuit 100 as a voltage reference.

In some embodiments, VRM 206 comprises a low-dropout regulator (LDO) that is configured to convert VDDA, which in some embodiments is a high noise and high supply voltage, to a continuously controlled, steady, low-noise DC output voltage based at least in part on the bandgap output 108. In other embodiments, VRM 206 may comprise a DC-DC converter such as buck or boost converter, pulse-frequency modulation (PFM) circuitry, pulse-width modulation (PWM) circuitry, power field-effect transistors (FETs), real-time clocks (RTCs) or any other circuitry that may be used to regulate a voltage signal, convert a voltage signal, step-up or step-down a voltage signal, remove noise from a voltage signal or perform other operations on a voltage signal.

Regulated output voltage 208 is provided to one or more components of low power component 204 including, e.g., low voltage components 210 and a clock generator 212. Low voltage components 210 may comprise, for example, digital circuitry, analog circuitry, mixed-signal circuitry or other low voltage circuitry.

Clock generator 212 is configured to output a clock signal 214 that is derived from regulated output voltage 208 and to provide clock signal 214 to voltage reference circuit 100 as part of input 110. In some embodiments, clock generator 212 is configured to generate clock signal 214 as a low amp, low supply noise. For example, clock signal 214 may comprise a clock pulse derived from regulated output voltage 208, high power supply rejection ratio (PSSR), a more stable pulse width over supply than a clock signal derived from VDDA, and a more stable frequency over supply to match the noise corner frequency than a clock signal derived from VDDA. The clock pulse may also have a lower amplitude than a clock signal derived from VDDA.

Error amplifier circuit 104 comprises an error amplifier 112, a chopper circuit 114 before error amplifier 112 and a chopper circuit 116 after error amplifier 112. In some embodiments, each of chopper circuits 114 and 116 receive input 110 and are configured in a similar manner to chopper circuit 106. Error amplifier circuit 104 outputs an error signal 118 that is used as the control voltage for transistors T1 and T2.

While described as having particular components herein, voltage reference circuit 100, bandgap circuit 102 and error amplifier circuit 104 may comprise alternative or additional components or configurations of circuitry that are commonly found in a voltage reference circuit, bandgap circuit or error amplifier circuit including, for example, startup circuitry. As an example, in some embodiments, voltage reference circuit 100 may be modified to be a current reference circuit, e.g., by replacing the portion of voltage reference circuit 100 after chopper circuit 106 with corresponding circuitry for outputting a current reference instead of a voltage reference.

Figure 4:
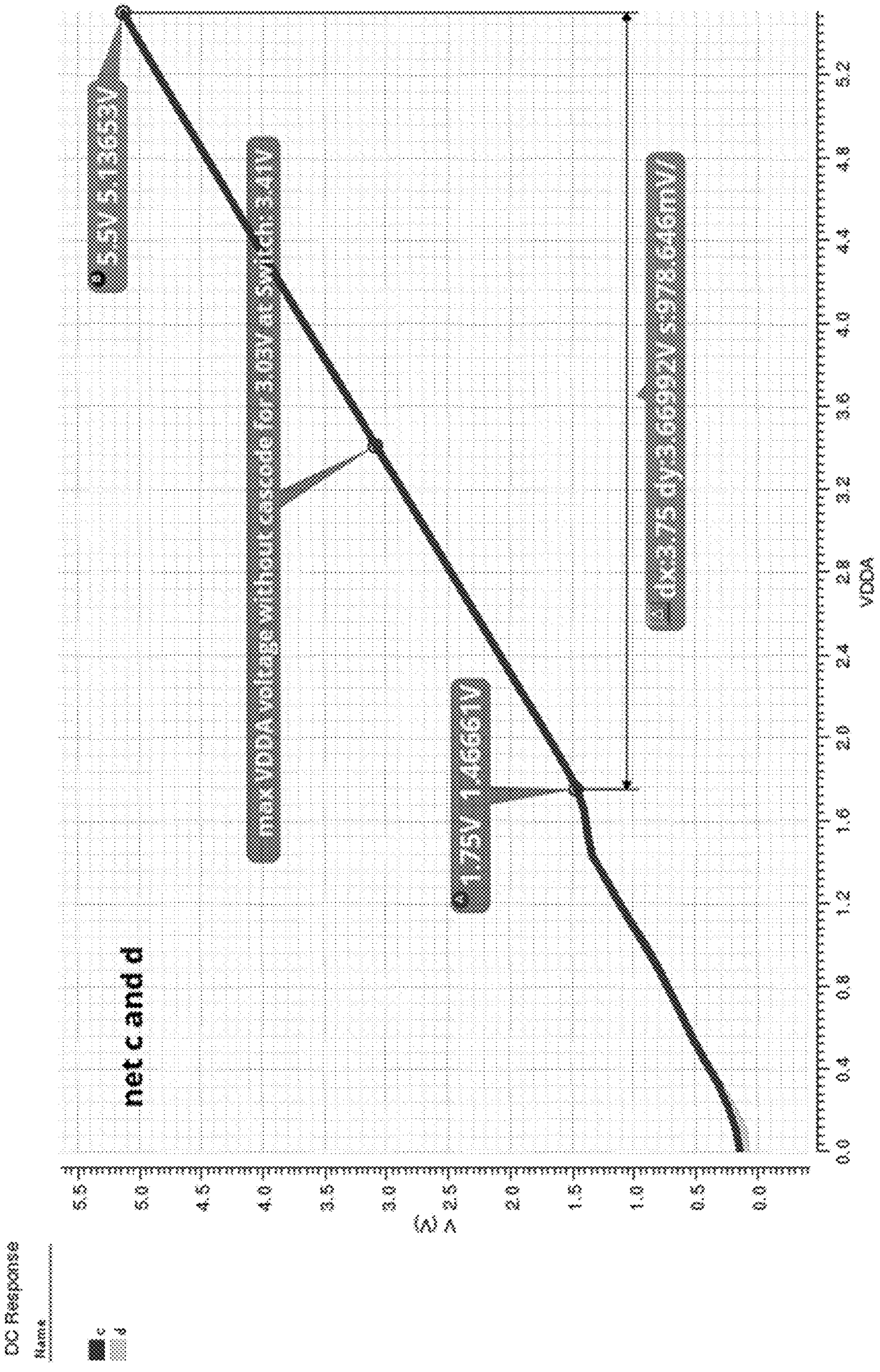
FIG. 4 is a diagram illustrating example voltage levels found at a first set of connections of the voltage reference circuit of FIG. 1 according to another embodiment.
Figure 5:
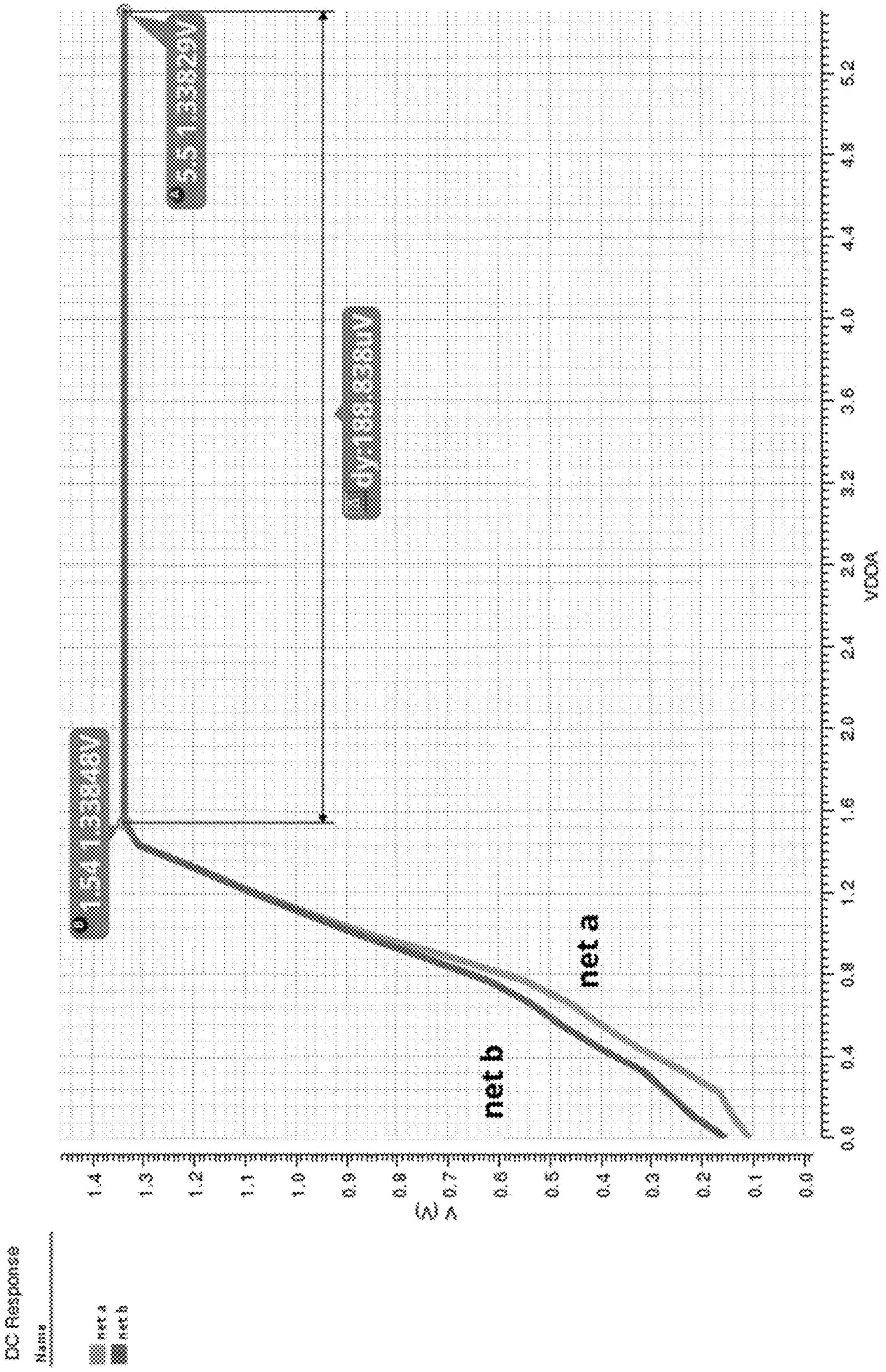
FIG. 5 is a diagram illustrating example voltage levels found at a second set of connections of the voltage reference circuit of FIG. 1 according to another embodiment.
Figure 6:
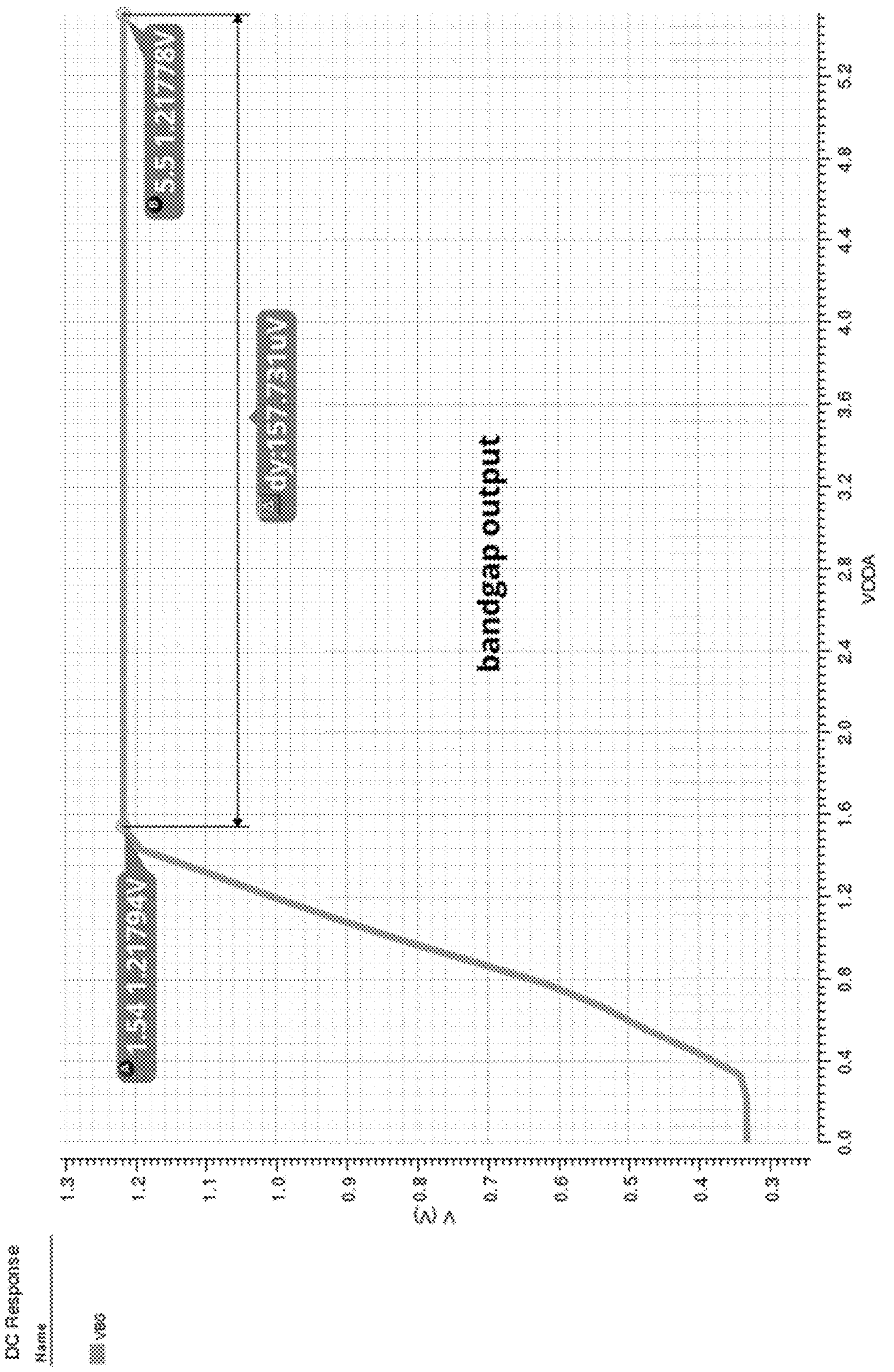
FIG. 6 is a diagram illustrating example voltage levels found at a bandgap output of the voltage reference circuit of FIG. 1 according to another embodiment.

With reference now to FIGS. 4-6 the functionality of voltage reference circuit 100 according to an illustrative embodiment will be described. In an example scenario, VDDA has a voltage in the range of 1.7V to 5.5V, VDDD has a voltage of 1.6V and bandgap output 108 has a voltage of 1.23V. The voltage of VDDD reduces the residual offset voltage by decreasing the amplitude of the control clock signal.

In the example scenario, the chopper circuit 106 comprises complimentary switches such as, e.g., transistors CT1, CT2, CT3 and CT4 as shown in FIG. 2, where bandgap output 108 of 1.23V is one source/drain and the control voltage has a maximum value of 1.8V. In this scenario, the maximum input voltage that each transistor may receive before damage occurs is 3.03V, e.g., 1.23V+1.8V, also referred to herein as the breakage threshold. Since VDDA has a range from 1.7V to 5.5V, any voltage of VDDA above the breakage threshold of 3.03V may damage transistors CT1, CT2, CT3 and CT4 of chopper circuit 106. Note that in this example scenario, transistors T1, T2, T3 and T4 are configured to function with the full range of VDDA.

In an illustrative embodiment, the use of transistors T3 and T4 in the cascode arrangement between transistors T1 and T2 of the current mirror arrangement and chopper circuit 106 enables the use of a chopper circuit 106 with a lower breakage threshold, thereby enabling smaller amplitudes to be utilized for the control clock signal which reduces residual offset voltage. For example, the cascode arrangement of transistors T3 and T4 may be configured to reduce the voltage output by transistors T1 and T2 to a level that is below the breakage threshold of chopper circuit 106 before input to chopper circuit 106.

FIG. 4 shows example voltage levels between transistors T1 and T2 and transistors T3 and T4 at connections C1 and C2. Connections C1 and C2 are referred to in FIG. 4 as reference c and reference d, respectively. As seen in FIG. 4, the voltage level at connections C1 and C2 may increase above the breakage threshold of 3.03V.

FIG. 5 shows example voltage levels between transistors T3 and T4 and chopper circuit 106 at connections C3 and C4. Connections C3 and C4 are referred to in FIG. 5 as reference a and reference b, respectively. As can be seen in FIG. 5, by implementing a cascode arrangement for transistors T3 and T4, the voltage level at the input of chopper circuit 106 is reduced below the breakage threshold for a VDDA higher than 1.6V.

FIG. 6 shows example voltage levels at bandgap output 108. As can be seen in FIG. 6, for VDDA higher than 1.6V, the voltage reference still has a steady value of 1.217V.

By implementing a voltage reference circuit 100 having transistors T3 and T4 in a cascode arrangement between transistor T1 and T2 and chopper circuit 106, the external supply voltage, VDDA, can have a higher voltage value and noise with a negligible impact on the performance of the voltage reference output since transistors T1, T2, T3 and T4 may comprise higher voltage devices, e.g., 5V devices as a non-limiting example, than transistors CT1-CT4 of bandgap circuit 106 which may comprise lower voltage devices, e.g., 1.8V devices as a non-limiting example. This allows the lower and higher supply voltage transistor types to be utilized efficiently with the lower voltage, low power transistors being separated from the external supply voltage, for example, as shown in FIG. 3.

Since chopper circuit 106 is protected from breakage due to the high voltage of VDDA, and instead relies on a lower control voltage VDDD and a low amplitude clock pulse that is derived from a VRM 206 that provides low noise, high PSSR, a more stable pulse width over supply and a more stable frequency over supply to match the noise corner frequency, the quality and stability of the signal output by chopper circuit 106 is improved over designs that rely on VDDA and an external high noise, high amplitude clock. In this manner voltage reference circuit 100 may reduce flicker noises caused by transistors T1 and T2 due to the current mirror arrangement and non-idealities due to manufacturing processes for transistors T1, T2, T3 and T4.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A voltage reference circuit comprising:

a first transistor circuit that is configured to receive an external supply voltage as an input and to output a first voltage;

a chopper circuit that is configured to receive a second voltage as an input and to output a voltage reference, the chopper circuit having a breakage threshold; and a second transistor circuit that is configured to receive the first voltage as an input and to output the second voltage at a value that is less than or equal to the breakage threshold of the chopper circuit, wherein a clock of the chopper circuit is derived by a clock generator based at least in part on a voltage output from a low-dropout regulator.

2. The voltage reference circuit of claim 1, wherein the second transistor circuit comprises a plurality of transistors configured in a cascode arrangement.

3. The voltage reference circuit of claim 1, wherein the first transistor circuit comprises a plurality of transistors configured in a current mirror arrangement.

4. The voltage reference circuit of claim 3, wherein the plurality of transistors of the first transistor circuit are configured to receive an output of an error amplifier circuit of the voltage reference circuit as a control voltage.

5. The voltage reference circuit of claim 3, wherein the plurality of transistors of the first transistor circuit comprise p-type metal-oxide-silicon (PMOS) transistors.

6. The voltage reference circuit of claim 1, wherein a control voltage of the chopper circuit is independent of the external supply voltage.

7. The voltage reference circuit of claim 6, wherein the control voltage of the chopper circuit is configured to be smaller than the external supply voltage.

8. The voltage reference circuit of claim 1, wherein the low-dropout regulator receives the external supply voltage and the voltage reference output by the chopper circuit as inputs.

9. The voltage reference circuit of claim 1, wherein the clock of the chopper circuit is independent of an external clock corresponding to the external supply voltage.

10. The voltage reference circuit of claim 9, wherein the clock of the chopper circuit has a smaller amplitude than the external clock corresponding to the external supply voltage.

11. A semiconductor device comprising:

a chopper circuit that is configured to receive a first voltage as an input and to output a fixed voltage reference, the chopper circuit having a breakage threshold based at least in part on a control voltage; and a transistor circuit comprising a plurality of transistors that are configured in a cascode arrangement, the transistor circuit being configured to receive a second voltage as an input and to output the first voltage at a value that is less than or equal to the breakage threshold of the chopper circuit, wherein a clock of the chopper circuit is derived by a clock generator based at least in part on a voltage output from a low-dropout regulator.

12. The semiconductor device of claim 11, wherein the first voltage is based at least in part on an external supply voltage.

13. The semiconductor device of claim 12, wherein the control voltage of the chopper circuit is independent of the external supply voltage.

14. The semiconductor device of claim 13, wherein the control voltage of the chopper circuit is configured to be smaller than the external supply voltage.

15. The semiconductor device of claim 11, wherein the low-dropout regulator receives the external supply voltage and the voltage reference output by the chopper circuit as inputs.

16. The semiconductor device of claim 15, wherein the clock of the chopper circuit is independent of an external clock corresponding to the external supply voltage.

17. The semiconductor device of claim 16, wherein the clock of the chopper circuit has a smaller amplitude than the external clock corresponding to the external supply voltage.

18. A voltage reference circuit comprising:

a first transistor that is configured to receive an external supply voltage as an input and to output a first voltage;

a second transistor that is configured to receive the external supply voltage as an input and to output a second voltage;

a third transistor that is configured to receive the first voltage as an input and to output a third voltage;

a fourth transistor that is configured to receive the second voltage as an input and to output a fourth voltage; and a chopper circuit that is configured to receive the third and fourth voltages as inputs and to output a fixed voltage reference, the chopper circuit having a breakage threshold based at least in part on a control voltage of the chopper circuit, wherein:

the first and second transistors are configured in a current mirror arrangement;

the third and fourth transistors are configured in a cascode arrangement, the cascode arrangement being configured to output the third and fourth voltages at values that are less than or equal to the breakage threshold of the chopper circuit; and a clock of the chopper circuit is derived by a clock generator based at least in part on a voltage output from a low-dropout regulator.

* * * * *